US009477508B1

(12) United States Patent
Vemuri

(10) Patent No.: US 9,477,508 B1
(45) Date of Patent: Oct. 25, 2016

(54) STORAGE DEVICE SHARING AMONG VIRTUAL MACHINES

(71) Applicant: Symantec Corporation, Mountain View, CA (US)

(72) Inventor: Hari Krishna Vemuri, Pune (IN)

(73) Assignee: Veritas Technologies LLC, Mountain View, CA (US)

( * ) Notice: Subject to any disclaimer, the term of this patent is extended or adjusted under 35 U.S.C. 154(b) by 123 days.

(21) Appl. No.: 14/227,081

(22) Filed: Mar. 27, 2014

(51) Int. Cl.
*G06F 12/06* (2006.01)
*G06F 9/455* (2006.01)
*G06F 3/06* (2006.01)

(52) U.S. Cl.
CPC .......... *G06F 9/45558* (2013.01); *G06F 3/067* (2013.01); *G06F 3/0608* (2013.01); *G06F 3/0647* (2013.01); *G06F 2009/4557* (2013.01)

(58) Field of Classification Search
CPC ... G06F 3/0605; G06F 3/0631; G06F 3/0647
USPC ................................................. 711/103, 170
See application file for complete search history.

(56) References Cited

U.S. PATENT DOCUMENTS

| 8,291,159 | B2 * | 10/2012 | Rajagopal | G06F 3/0605 |
| | | | | 709/226 |
| 8,996,807 | B2 * | 3/2015 | Joshi | G06F 9/45558 |
| | | | | 711/100 |
| 9,294,558 | B1 * | 3/2016 | Vincent | H04L 67/1006 |
| 2013/0282994 | A1 * | 10/2013 | Wires | G06F 9/45558 |
| | | | | 711/158 |
| 2014/0025770 | A1 * | 1/2014 | Warfield | G06F 15/17331 |
| | | | | 709/213 |
| 2014/0052877 | A1 * | 2/2014 | Mao | H04L 61/103 |
| | | | | 709/245 |
| 2014/0095826 | A1 * | 4/2014 | Rajagopal | G06F 3/0605 |
| | | | | 711/170 |
| 2014/0136809 | A1 * | 5/2014 | Engle | G06F 3/067 |
| | | | | 711/170 |

* cited by examiner

*Primary Examiner* — Pierre-Michel Bataille
(74) *Attorney, Agent, or Firm* — Campbell Stephenson LLP

(57) ABSTRACT

Disclosed herein are various systems and methods for sharing a storage device with multiple virtual machines are disclosed. One such method involves creating a pseudo-identity for a storage device and assigning a portion of an address space of the storage device to a virtual machine using the pseudo-identity. The storage device is coupled to a computing device and the pseudo-identity is created by a hypervisor associated with the computing device. The pseudo-identity facilitates access to the storage device by the virtual machine associated with the hypervisor and also facilitates presentation of one or more physical characteristics of the storage device to the virtual machine. The method also assigns a portion of an address space of the storage device to the virtual machine using the pseudo-identity.

21 Claims, 9 Drawing Sheets

300A

| Mapping Table 310 | | | |
|---|---|---|---|
| Virtual Machine | Storage Device | Identity/ Characteristics | Address Space |
| 120(1) | 110(1) | X/Y | 101-150 |
| 120(2) | 110(1) | X/Y | 151-350 |
| 120(3) | 110(1) | X/Y | 526-800 |
| 120(4) | 110(1) | X/Y | 801-1000 |

| Migration Table 320 | | | |
|---|---|---|---|
| Virtual Machine | Storage Device | Identity/ Characteristics | Address Space |
| 120(1) | 110(N) | X/Z | 1-50 |
| 120(2) | 110(N) | X/Z | 51-200 |
| 120(4) | 110(N) | X/Z | 201-400 |

*FIG. 3B*

STORAGE DEVICE SHARING AMONG VIRTUAL MACHINES

FIELD OF THE INVENTION

This invention relates to data storage in a virtual environment, and more particularly, to storage device sharing among virtual machines.

DESCRIPTION OF THE RELATED ART

A virtual machine (VM) is a software implementation of a computing system that executes on a physical computing system (e.g., a computing device). A computing device supporting multiple virtual machines typically does so, at least in part, through the use of system software and/or hardware that manages the host computing device's resources in a manner that allows the host computing device to present a hosted virtual environment in each of the virtual machines. A hosted virtual environment permits multiple virtual machines supported by the computing device to share a physical storage device (e.g., a solid state disk).

Multiple virtual volumes of a physical storage device can be created and shared with multiple virtual machines. If a virtual machine uses physical space of the physical storage device to store data, it becomes bound to the physical storage device. Therefore, virtual machines use virtual volumes because virtual volumes utilize a virtual storage space and hence the virtual machines are not bound to the physical storage device. However, if a virtual machine uses a virtual volume, the virtual machine is not privy to the physical behavior and/or operating characteristics of the physical storage device because the hosted virtual environment only presents a virtualized model behavior of the physical storage device to the virtual machine.

SUMMARY OF THE INVENTION

Various systems and methods for sharing a storage device with multiple virtual machines are disclosed. One such method involves creating a pseudo-identity for a storage device (or multiple storage devices) and assigning a portion of an address space of the storage device (or multiple storage devices) to a virtual machine using the pseudo-identity. The storage device is coupled to a computing device and the pseudo-identity is created by a hypervisor associated with the computing device. The pseudo-identity facilitates access to the storage device by the virtual machine associated with the hypervisor and also facilitates presentation of one or more physical characteristics of the storage device to the virtual machine. The method assigns a portion of an address space of the storage device to the virtual machine using the pseudo-identity.

The method also involves modifying a response to a command issued to the storage device by the virtual machine to obtain a capacity and one or more physical characteristics of the storage device, where the response to the command includes the capacity and the one or more physical characteristics of the pseudo-identity of the storage device and one or more physical characteristics of the storage device that is exposed to the virtual machine. Calculating the read-capacity of the storage device obtains details related to the storage device (e.g., storage device capacity). The capacity of the storage device is determined by the read-capacity command and pseudo-identity and the physical characteristics of the storage device are determined by an inquiry command. The mapping of the virtual machine can be migrated (changed) from the storage device to another storage device, where prior to the migration (change), the hypervisor emulates and assigns the pseudo-identity of the storage device to another storage device.

In some embodiments, each virtual machine associated with the hypervisor is assigned to a unique address space of the storage device. The unique address space assigned to each virtual machine is different, and each virtual machine can share the pseudo-identity of the storage device.

In other embodiments, each virtual machine has access to one or more physical characteristics of the storage device. The physical characteristics of the storage device are visible to the virtual machine and can include an operating temperature of the storage device, a wear-leveling associated with the storage device, a cleanup activity associated with the storage device, or an administrator provided command to stop or start using the storage device. The physical characteristics of the storage device are associated with an operating condition of the storage device.

The method also involves calculating the operating condition of the storage device and another operating condition of another storage device, and comparing the operating condition and the another operating condition. Based on the comparison, the method determines whether to migrate the mapping (change the mapping) of the virtual machine (and its allocated address space) from the storage device to another storage device. The migration of the mapping (mapping change) is performed if another operating condition of another storage device is optimal compared to the operating condition of the storage device.

The foregoing is a summary and thus contains, by necessity, simplifications, generalizations and omissions of detail; consequently those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings.

FIG. 3A illustrates a mapping table, according to one embodiment of the present invention.

FIG. 3B illustrates a migration table, according to one embodiment of the present invention.

Figure 1A:
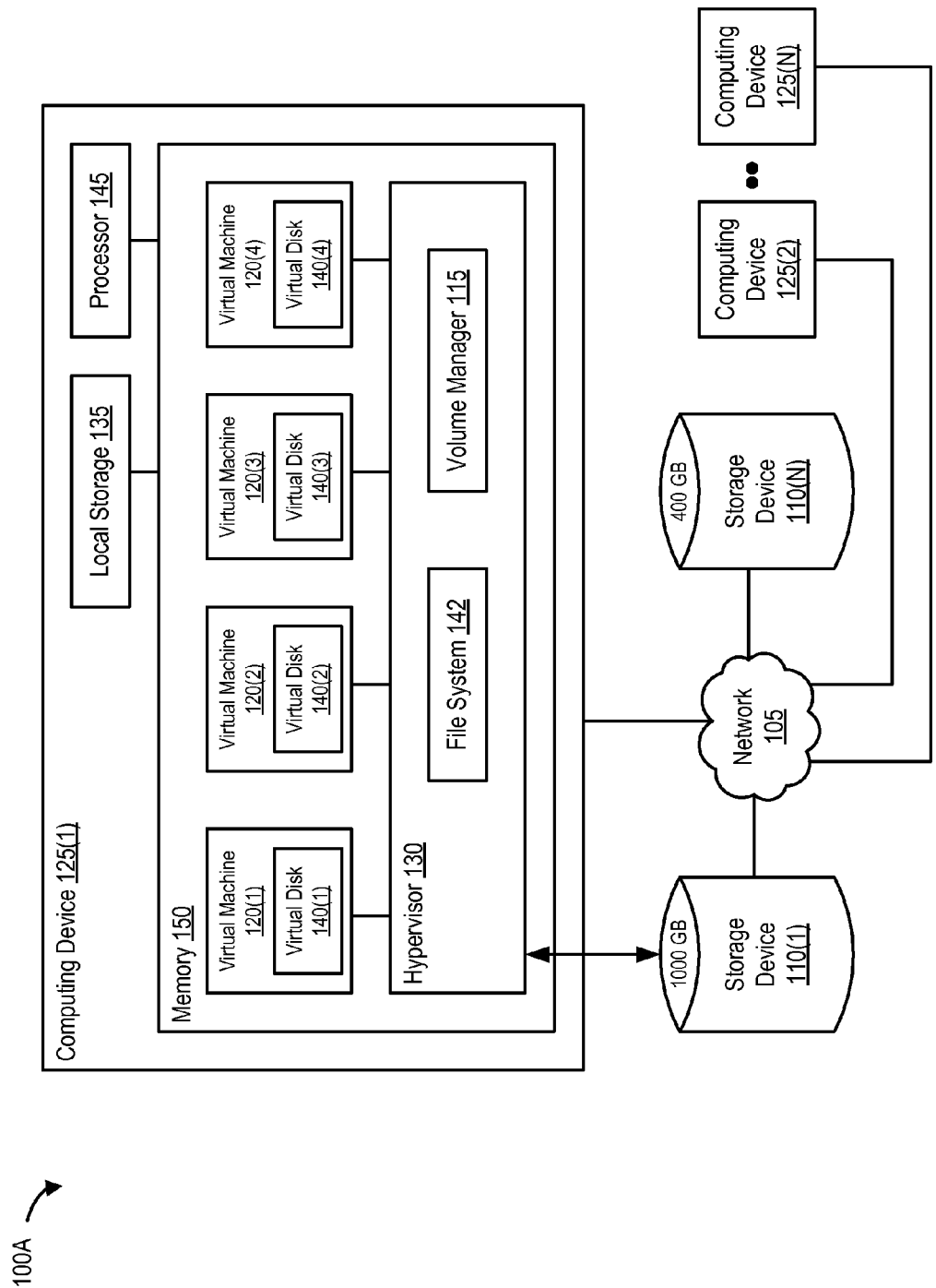
FIG. 1A is a block diagram of a computing device that supports virtual machines, according to one embodiment of the present invention.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

Introduction

A physical storage device can be partitioned into multiple partitions and each partition can be assigned to a virtual machine. In this manner, multiple virtual machines supported by the computing device can share a physical storage device. In a virtual machine environment, a logical partition realizes the advantages of virtualization but like virtual volumes, the virtual machine assigned to the partition is not privy to the physical behavior and/or characteristics of the physical storage device. On the other hand, a physical partition permits the virtual machine to view, access, and take advantage of the physical storage device's physical behavior and/or characteristics, but because the virtual machine is bound to the physical storage device, the benefits of virtualization are not realized.

Embodiments of the present invention allow a storage device (or multiple storage devices) to be shared between multiple virtual machines. In some embodiments, the storage device can be a solid state disk (SSD) and can be used by a virtual machine associated with a hypervisor to store data. A virtual machine is a software implementation of a computing system that executes on a computing device. Virtual machines are simulations of the computing device that execute computer instructions in a manner that produces results expected of the computing device. Resources of the computing device are allocated to support the virtual machine (or several virtual machines). These allocated resources can include both "time shares" of a physical resource, such as a "cycle" of a processor and semi-permanent allocations, such as the allocation of space on a disk volume. For example, storage space can be allocated to a virtual machine in the form of a container file on a physical drive. These container files are typically referred to as virtual disks. The computing device (e.g., a hosting server) can allocate disk space on physical disks associated with the computing device to multiple virtual machines.

A hypervisor is software and/or hardware that provides a computing device the ability to concurrently support multiple virtual machines. The hypervisor coordinates distribution of the computing device's resources (e.g., processing power, memory, etc.) among several virtual machines. The computing device, acting as a host computer system, supports multiple virtual machines and manages system resources to present a hosted virtual environment to each of the virtual machines. Each virtual machine shares the host computer system's resources. Processor resources and memory management are provided to each virtual machine. Virtualization functionality can be provided, for example, through the use of a system virtual machine (sometimes referred to as a hardware virtual machine), or via software virtualization. Regardless of the approach employed, virtualization allows sharing of the underlying computing device's resources between different virtual machines, each running its own copy of a given operating system. For example, when a hypervisor is used, the hypervisor also acts as a virtualization component (e.g., a software abstraction layer), and coordinates and manages host resources. The hypervisor coordinates processor resources to execute instructions on behalf of virtual machines, and performs memory management to ensure effective sharing of the host system memory.

A hypervisor can also assist one or more virtual machines to store data in one or more storage devices. A storage device can be shared among multiple virtual machines using, for example, unique address spaces. An address space defines a range of discrete addresses in the storage device, each of which may correspond to a different virtual machine. If a virtual machine needs to store data on a storage device, the virtual machine can use a Small Computer System Interface (SCSI) command to determine the storage capacity of a storage device (e.g., using a SCSI read-capacity command). The virtual machine sends a SCSI command to the storage device via the hypervisor. Data is then transferred between the virtual machine and the storage device. A storage device's response to a SCSI command from the virtual machine typically includes the size and identity of the storage device.

A hypervisor, by acting as a software abstraction layer, can be particularly useful in sharing a single storage device between multiple virtual machines such that a storage solution implemented in a virtual environment can realize the benefits of a physical device's physical characteristics as well as the advantages of virtualization. For example, by modifying the response to a read-capacity command, the hypervisor can carve out multiple virtual storage spaces on a single storage device (which may be a physical and/or logical storage device) by creating a pseudo-identity for the storage device, and assign only a portion of an address space of the storage device to each virtual machine. In addition, the response to the command can also be modified to include one or more physical characteristics of the storage device, which can be useful in determining whether the mapping of the virtual machine should be migrated (mapped to) to another storage device (e.g., by using a mapping file) with a better operating condition.

An Example for Storage Device Sharing Among Virtual Machines

FIG. 1A is a block diagram of a computing device. Computing device 125(1) is coupled to storage device 110(1) that can implement a cache. Computing device 125(1) includes hypervisor 130 that provides computing device 125(1) the ability to concurrently support multiple virtual machines 120(1)-120(4). Virtual machines 120(1)-120(4) each implement corresponding virtual disks 140(1)-140(4). Storage device 110(1) is coupled to computing device 125(1), and can include one or more of a variety of different storage devices, including hard disks, compact discs, digital versatile discs, solid state drive (SSD) memory such as Flash memory, and/or other storage devices, such as described subsequently herein.

In this example, computing device 125(1) implements a file system 142. File system 142 is a software program that organizes and controls access to files. The term "file system"

can refer to both the software application (which itself can be part of an operating system or database) that organizes the files and the collection of files that are organized by that application. Files can be organized hierarchically, with directories collecting groups of files and/or other directories. A file system application like file system 142 can provide another application, such as a DBMS application, with access to files (e.g., to open, read, modify, create, delete, and otherwise interact with the data within the files).

Figure 1B:
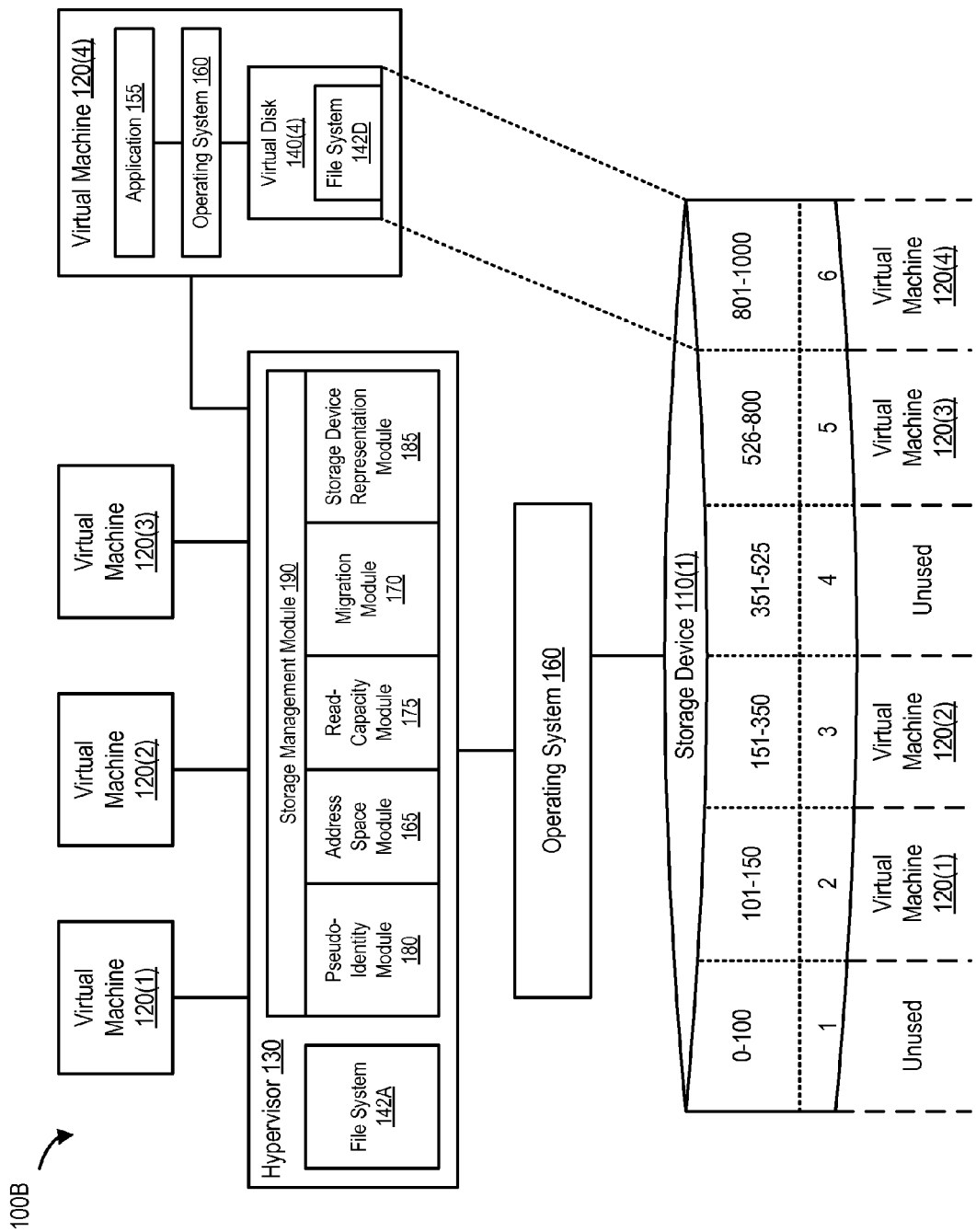
FIG. 1B is a block diagram of a storage device that is shared among multiple virtual machines, according to one embodiment of the present invention.

FIG. 1B is a block diagram of a storage device that is shared among multiple virtual machines. An advantageous feature of a computing device that supports at least one virtual machine is the ability to support the execution of an operating system (e.g., operating system 160) on those virtual machines. Hypervisor 130 provides the ability for computing device 125(1) to implement virtual machines 120(1)-120(4). For example, hypervisor 130 permits virtual machine 120(4) to run application 155 and execute operating system 160. File system 142D implemented on virtual machine 120(4) tracks (e.g., by monitoring the movement of files) how the files file system 142D organizes map to blocks of data within storage device 110(1) (e.g., using file system metadata). This way, when application 155 requests access to a particular file (e.g., using the file name of the file), file system 142D can translate that request into information hypervisor 130 and operating system 160 can use to make a request for the particular blocks of data included in the requested file. Accordingly, file system 142D knows which blocks of data in storage device 110(1) belong to each file.

Typically, when multiple virtual machines try to read to and/or write from the same storage device, such virtual machines either read to and/or write from a partition on the storage device and/or a virtual volume associated with the storage device. If a virtual machine accesses a storage device that is partitioned, each virtual machine is only permitted to read to and/or write from a dedicated partition. For example, if a storage device is partitioned, a virtual machine is assigned to a pre-determined storage space on the storage device that is smaller than the total capacity of the storage device. In the case of a logical partition, the virtual machine does not see (nor is able to access and benefit from the knowledge of) the physical characteristics of the storage device because the storage device is virtualized as a separate storage device. Reading to and/or writing from a virtual volume also faces similar limitations. In the case of a physical partition, which is done at the hardware level, the virtual machine is bound to the physical characteristics of the storage device and is unable to utilize the virtualization characteristics of the storage device.

To remedy the aforementioned limitations encountered when a virtual machine reads to and/or writes from a storage device (represented by a virtual storage device), hypervisor 130 implements read-capacity module 175 in conjunction with address space module 165. Read-capacity module 175 modifies a response to a command issued to the storage device by a virtual machine. For example, if virtual machine 120(4) requires 200 GB of storage space for a storage operation and issues a read-capacity command to storage device 110(1), read-capacity module 175 does not return the total storage capacity of storage device 100(1), which is 1000 GB. Instead, read-capacity module 175 modifies the expected response to the read-capacity command and returns a value of 200 GB to virtual machine 120(4). In addition, address space module 165 assigns 200 GB to virtual machine 120(4) at address space 6 (801-1000) of storage device 110(1). By virtue of receiving a modified response to its read-capacity command, virtual machine 120(4) is assigned to address space 6 (801-1000) which has 200 GB (the storage space requested by virtual machine 120(4) for the storage operation) and in addition, according to virtual machine 120(4), storage device 110(1) appears to have a total storage capacity of 200 GB.

A similar command response modification and address space assignment process can be contemplated for virtual machines 120(1), 120(2) and 120(3). In this example, virtual machine 120(1) is assigned to address space 2 (101-150) on storage device 110(1), virtual machine 120(2) is assigned to address space 3 (151-300) on storage device 110(1) and virtual machine 120(3) is assigned to address space 5 (526-800) on storage device 110(1). The address space need not be contiguous and can contain a list of portions on one or more storage devices that include the pseudo-identity. According to virtual machines 120(1), 120(2) and 120(3), the total storage capacity of storage device 110(1) is 50 GB, 200 GB and 275 GB respectively. In this example, unbeknown to virtual machines 120(1)-120(4), storage device 110(1) still has a total of 275 GB of unused/free storage space. In one embodiment, a pseudo storage device can be backed up one or more portions of one or more physical storage devices to construct the required address space.

In addition to modifying the response to read-capacity command (e.g., by using read-capacity module 175) and assigning only a portion of an address space of storage device 110(1) (or a set of one or more storage devices that represent the pseudo storage device) to virtual machines 120(1)-120(4), hypervisor 130 also implements a pseudo-identity module 180 that replicates the identity of storage device 110(1). In one embodiment, various storage devices have the same pseudo-identity. For example, storage device 110(1) and storage device 110(N) can share the same pseudo-identity. In addition to implementing read-capacity module 175 and address space module 165, hypervisor 130 can also implement pseudo-identity module 180 to assign a static value to the identity of storage device 110(1). In the example of FIG. 1B, pseudo-identity module 180 presents, via hypervisor 130, the same simulated pseudo-identity of storage device 110(1) to virtual machines 120(1)-120(4) by modifying, for example, the response to a SCSI inquiry. In alternate embodiments, a pseudo-identity is associated with a virtual machine. Every virtual machine can have the same pseudo-identity, or each virtual machine can have a different pseudo-identity. However, the mapping of the virtual machine to a storage device can be changed as long as the pseudo-identity is constant for each virtual machine.

It should be noted that, in some embodiments, hypervisor 130 can modify the response to a variety of commands. These commands can include a read-capacity command, a read command, a write command, an inquiry command, or any other SCSI command, whether mandatory, optional or vendor-specific. For example, the identity of the storage device is determined by a SCSI inquiry command (which is used to obtain a world wide name, physical characteristics, etc.) and a SCSI read-capacity command is used to obtain the size of the storage device. In addition, although the present invention only references SCSI commands (e.g., a SCSI read-capacity command), the present invention envisions any computer command that one or more virtual machines and/or computing devices use to read to, write from, and/or access, one or more storage devices.

The result of hypervisor 130 implementing read-capacity module 175, address space module 165, and pseudo-identity module 180 in the example of FIG. 1B has at least three consequences. First, read-capacity module 175, in one embodiment, modifies the response from storage device 110(1) to a read-capacity command from virtual machines 120(1)-120(4) and returns a value that is appropriate to the storage space requested and/or required by each virtual machine, for example, in relation to a storage operation. Second, address space module 165, in other embodiments, assigns a portion of an address space of storage device 110(1) to virtual machines 120(1)-120(4). Third, and in some embodiments, pseudo-identity module 180 presents the same pseudo-identity, or a set of pseudo-identities, of storage device 110(1) to virtual machines 120(1)-120(4).

Sharing storage device 110(1) among virtual machines 120(1)-120(4) in this manner presents a single storage device as four different storage devices, each with a different capacity—but the same pseudo-identity, to virtual machines 120(1)-120(4). Because each virtual machine reads from and/or writes to a different address space on storage device 110(1), each virtual machine works in its own space, which is a portion of storage device 110(1). However, each virtual machine is also privy to the physical characteristics of storage device 110(1). This method permits dynamically growing or shrinking the storage space allocated in storage device 110(1) for a particular virtual machine. For example, the unused space in address space 351-525 of storage device 110(1) can be allocated to virtual machine 120(2) by modifying the response to a command to include an address space from 151-525 and a storage capacity of 375 GB for storage device 110(1).

Figure 1C:
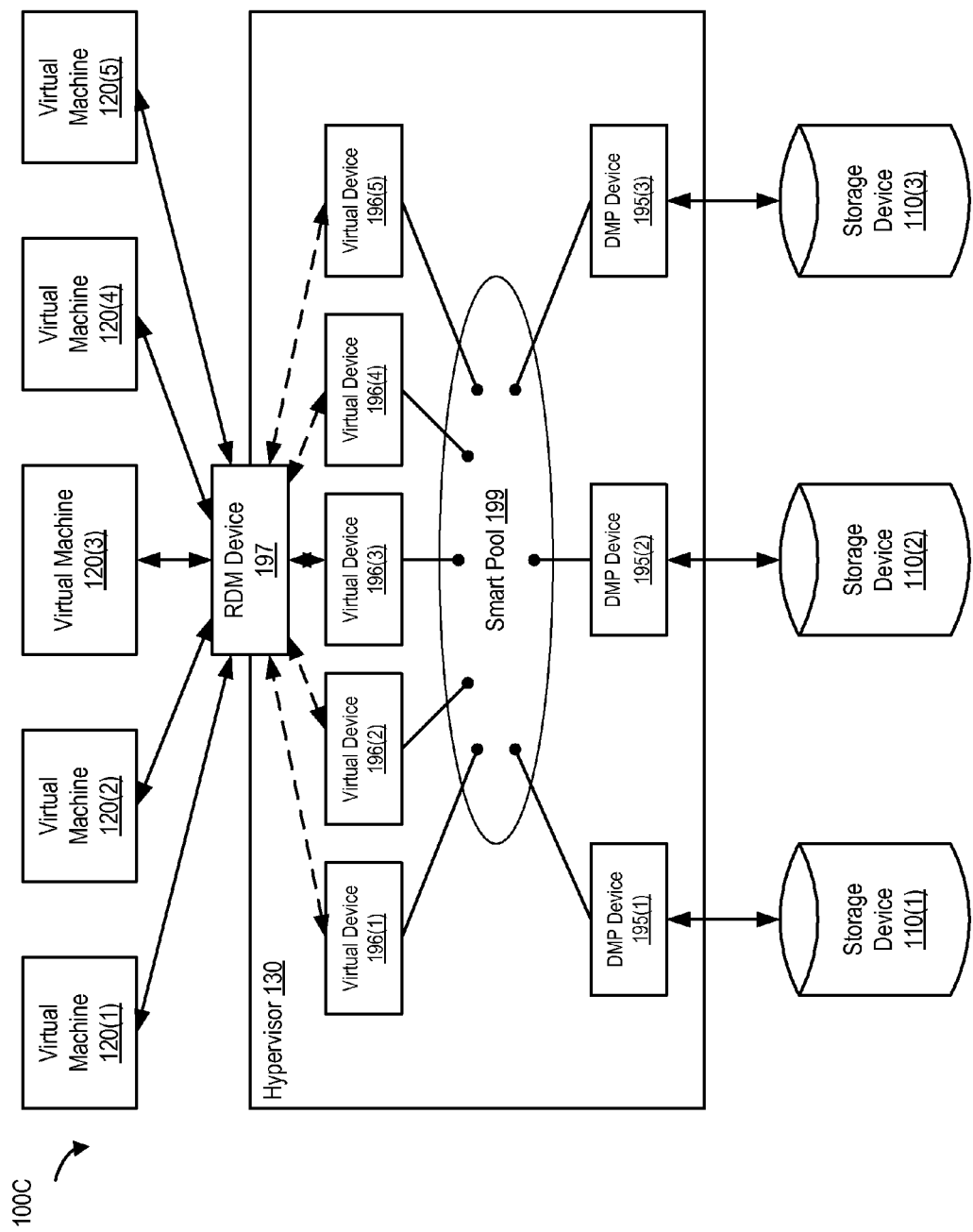
FIG. 1C is a block diagram that illustrates the mapping between storage devices and virtual machines using a hypervisor, according to one embodiment of the present invention.

FIG. 1C is a block diagram of a mapping between storage devices and virtual machines using a hypervisor. Virtual devices 196(1)-196(5) as illustrated herein are representations of virtual disks 140(1)-140(5) in a mapping module (not shown). Hypervisor 130 includes Dynamic Multi-Pathing (DMP) devices 195(1)-195(3) which are coupled to storage devices 110(1)-110(3) respectively. In the technology field of computer data storage, DMP refers to a multi-path input/output (I/O) enhancement technique that balances I/O across many available paths from a computing device (e.g., hypervisor 130 implemented on computing device 125(1)) to a storage device to improve performance and reliability. DMP devices 195(1)-195(3) can interact with mapped representations of virtual disks 140(1)-140(5) (shown as virtual devices 196(1)-196(5)) through smart pool 199. A smart pool can be any connection pooling component (e.g., a Java™ component) modeled on connection pooling features provided by an application server and/or computing device.

In one embodiment, mapped representations of virtual disks 140(1)-140(5) (shown as virtual devices 196(1)-196 (5)), as illustrated in FIG. 1C, respond to I/O and read-capacity. Virtual machines 120(1)-120(5) all share the same Raw Device Mapping (RDM) device 197 and access to the RDM device is mapped to the mapped representations of virtual disks 140(1)-140(5) (shown as virtual devices 196 (1)-196(5)) in hypervisor 130 based on the pseudo-identity of virtual machines 120(1)-120(5). RDM device 197 can enable a Storage Logical Unit Number (LUN) to be directly connected to a virtual machine from a Storage Area Network (SAN). An RDM device can enable virtual disk access in a virtual machine environment.

In an alternate embodiment, disk access can also be enabled by implementing file system 142 for data center applications (including databases, customer relationship management (CRM) applications and enterprise resource planning (ERP) applications. However, an RDM device can be preferable for configurations involving clustering between virtual machines, between physical and virtual machines, or where SAN-aware applications are running inside virtual machines.

Figure 2A:
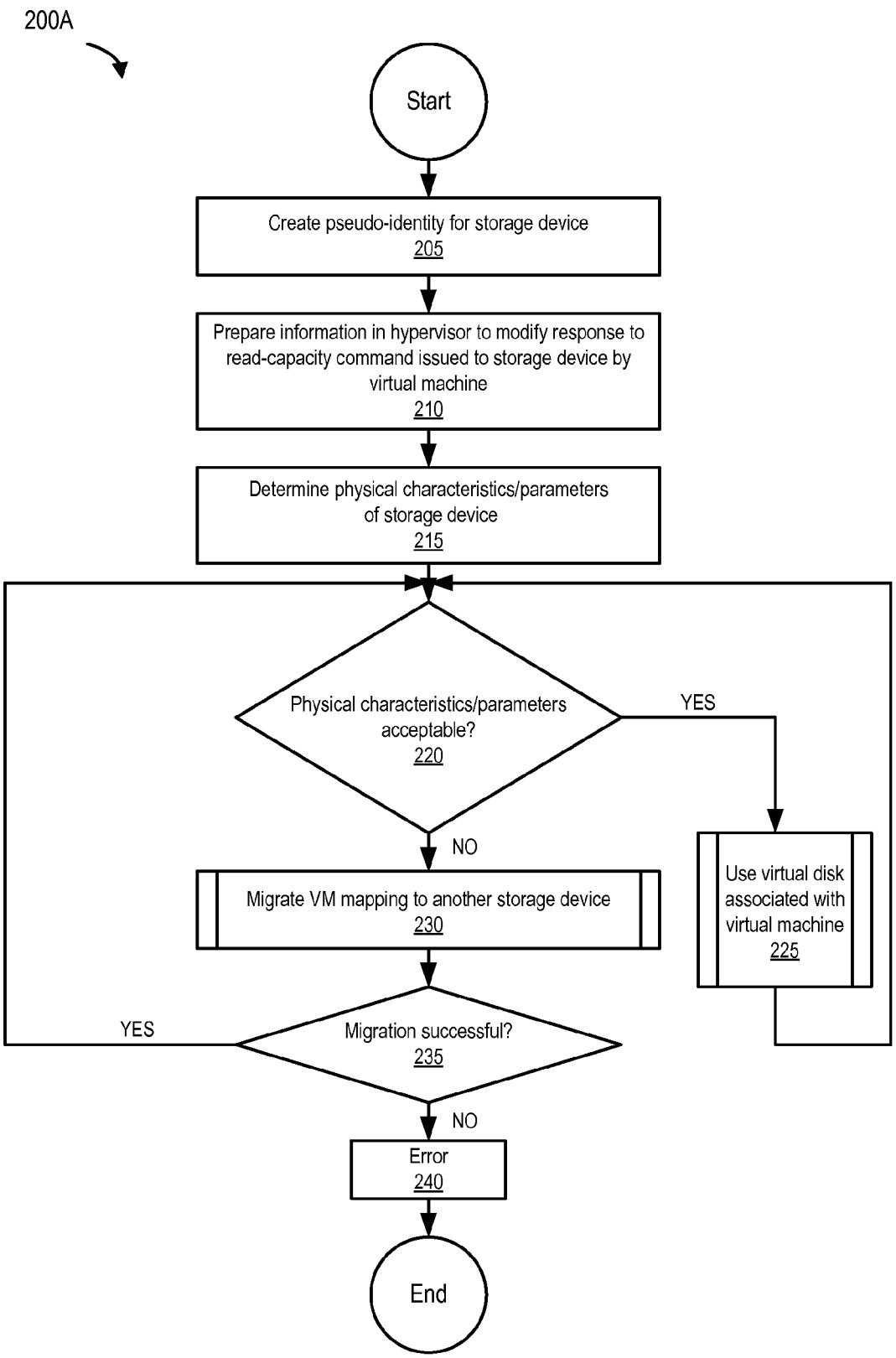
FIG. 2A is a flowchart of a method of using a storage device with a pseudo-identity, according to one embodiment of the present invention.

FIG. 2A is a flowchart of a method for sharing a storage device with multiple virtual machines. The methods begins at 205 by creating a pseudo-identity for storage device 110(1). In one embodiment, the pseudo-identity of storage device 110(1) shown and/or presented to virtual machines 120(1)-102(4) by hypervisor 130 is held constant. The upper layer of hypervisor 130 presents a constant pseudo-identity of storage device 110(1) and also makes visible physical characteristics of storage device 110(1) to virtual machines 120(1)-120(4). In this embodiment, the physical characteristics of storage device 110(1) are also held constant when presented to virtual machines 120(1)-120(4). Because all virtual machines supported by the hypervisor see a pseudo-identity of the storage device, address space module 165 can assign only a portion of an address space of storage device 110(1), while the virtual machine is under the impression that the virtual machine has access to the entire and/or complete storage device.

Storage devices can be described by their physical storage characteristics. These characteristics can include, among other things, whether or not the storage device can store data permanently, how the computing device locates data in the storage device (e.g., by implementing file system 142), and whether or not the storage device needs constant electric power to store data. For example, storage device 110(1) can be a persistent storage device (e.g., a hard disk), a SSD-based storage device, or some other non-transitory computer-readable medium.

A persistent storage device is described as providing persistent storage because data stored on the persistent storage device can be maintained (e.g., for a non-negligible time, such as several minutes, hours, days, weeks, years, decades, and so on), even if power to the persistent storage device and/or to a drive that reads and writes to persistent storage device is interrupted or cycled off for a non-negligible time. Because storage devices (e.g., persistent storage devices) are often, due to reasons of cost, reliability, and the like, unable to provide access performance as high other types of storage devices, the time needed to access data on such a persistent storage device can be a limiting factor. Accordingly, many systems use a storage device than can be accessed more quickly to temporarily store the portion of an application's data that are currently needed, for example, by a database management system (DBMS), in order to improve DBMS performance. In certain embodiments of the present invention, such storage can be implemented on such a storage device, which for example, can be an SSD-based storage device.

The method continues at 210 by preparing information (e.g., in hypervisor 130) needed to modify a response to a command (e.g., a SCSI inquiry command) issued to a storage device by a virtual machine. In one embodiment, by modifying the response to the command, hypervisor 130 introduces several capabilities applicable to storage device 110(1) into the hypervisor's upper layer. Hypervisor 130 can model (e.g., the upper layer of the hypervisor can present a unified and constant view of the identity and characteristics of the underlying storage device by acting as a software abstraction layer) the characteristics of the storage device before hypervisor 130 presents these characteristics to virtual machines 120(1)-120(4). For example, hypervisor 130 can convey the physical characteristics of the storage device to the virtual machine accessing the virtual storage device that presents the storage device. This physical to virtual mapping can then be held constant by hypervisor 130 and presented in a consistent manner to virtual machines 120(1)-120(4), for example, in the form of metadata.

After modifying a response to a command, the method continues at 215 and determines the physical characteristics of the storage device. At 220, the method checks if the physical characteristics and/or parameters of the storage device is acceptable and/or optimal. For example, hypervisor 130 facilitates the procurement of the physical characteristics of the storage device by mapping to the storage device. Hypervisor 130 then models the physical characteristics of the storage device (e.g., the hypervisor virtualizes the physical characteristics of the storage device as pseudo-characteristics) and presents the virtualized version of the physical characteristics to the virtual machines accessing the storage device via their respective virtual storage devices. If the physical characteristics of the storage device are deemed acceptable and/or optimal, the method, at 225, uses the virtual disk associated with the virtual machine, for example, to store data. If the physical characteristics are not acceptable and/or optimal, the method, at 230, migrates the mapping of the virtual machine to another storage device.

Physical characteristics and/or parameters deemed acceptable and/or optimal can include a safe or reliable operating temperature, an ample amount of free space for additional storage operations, a cleanup activity that has already been completed, and/or the implementation of a dynamic and/or static wear-leveling operation for prolonging the service life of the storage device. For example, an acceptable and/or optimal physical characteristic and/or parameter may include the implementation of a dynamic wear-leveling operation on the storage device by using a map to link the storage device's Logical Block Addresses (LBAs) from the operating system to the storage device. A storage device with wear-leveling enabled can last longer than another storage device with no wear-leveling. Thus, the presence of an ongoing wear-leveling operation or the future implementation of a wear-leveling operation can be deemed to be an acceptable and/or optimal physical characteristic and/or parameter of the storage device.

Figure 2B:
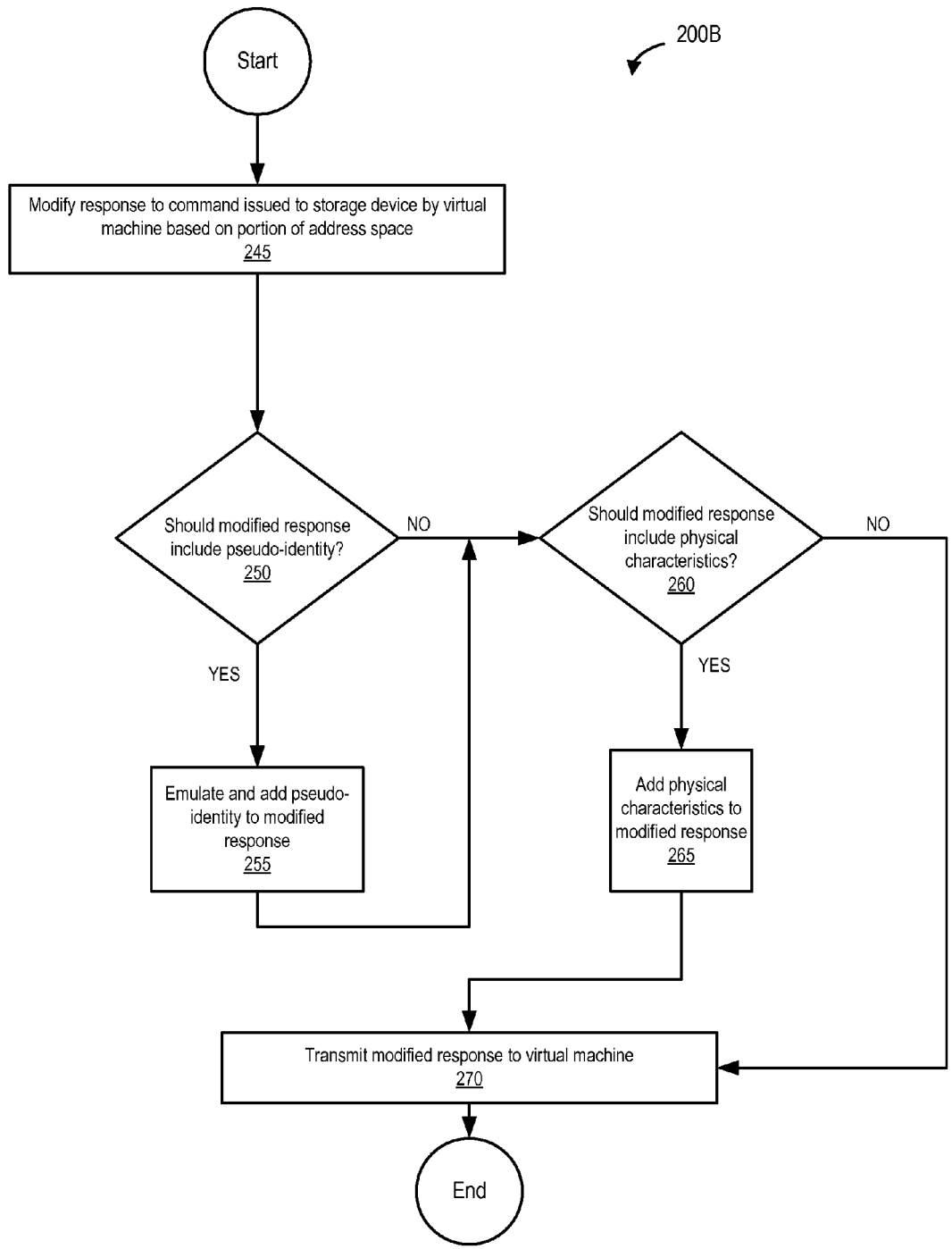
FIG. 2B is a flowchart of a method of transmitting a modified response to a virtual machine, according to one embodiment of the present invention.

FIG. 2B is a flowchart of a method of modifying and transmitting a response from a storage device to a virtual machine, via a hypervisor. Pseudo-identity module 180 running on hypervisor 130 can show a pseudo-identity of storage device 110(1) to hypervisor 130, which in turns presents the same pseudo-identity to all the virtual machines the hypervisor implements and supports. In some embodiments, a storage device's pseudo-identity can span other storage devices on alternate computing devices. For example, computing device 125(1) can be coupled to storage device 110(1) and computing device 125(2) can be coupled to storage device 110(N). Each storage device can also have its own hypervisor running pseudo-identity module 180. In this example, the pseudo-identity module 180 running on both computing device 125(1) and computing device 125(2) (coupled by network 105) can present the same pseudo-identity of any storage device coupled to each computing device (e.g., storage device 110(1) and storage device 110(N)), to the hypervisor associated with each computing device, and by extension, to each virtual machine implemented and supported by the corresponding hypervisor (e.g., virtual machines 120(1)-120(4)).

In one embodiment, the presentation of the same pseudo-identity can be achieved by assigning a unique World Wide Name (WWN) or World Wide Identifier (WWID) to each storage device. A WWN is a unique identifier used in storage technologies including Fiber Channel, Advanced Technology Attachment (ATA), and as discussed herein, Serial Attached SCSI (SAS). A WWN may be employed in a variety of roles, such as a serial number or for addressability. In this example, a WWN can be used to assign the same pseudo-identity to a variety of storage devices, including storage device 110(1) and storage device 110(N). In other embodiments, a WWN, when implemented as a pseudo-identity, can be used to mask the identities of multiple storage devices from multiple vendors, and present the identities of the various storage devices in a unified manner to multiple virtual machines as belonging to the same vendor. Because the hypervisor sees the pseudo-identity (e.g., assigned by pseudo-identity module 180) and passes and/or transmits the pseudo-identity to the virtual machine based on a direct mapping and/or a pass through mapping strategy, even the virtual machine starts seeing the identities of multiple storage devices from multiple vendors as a single unified pseudo-identity associated with same vendor and the same storage device. Because the virtual machines supported by the hypervisor are presented with a pseudo-identity of the storage device, address space module 165 can assign only a portion of an address space of storage device 110(1), while from the perspective of the virtual machine, that portion of the storage device appears as the entire storage device to the virtual machine.

At 250, the method checks to determine if the modified response should include the pseudo-identity. If the modified response should include the pseudo-identity, the method, at 255, emulates and adds the pseudo-identity to the modified response. If the modified response should not include the pseudo-identity, the method, at 260, checks to determine if the modified response should also include the physical characteristics of the storage device. If the physical characteristics should not be included in the modified response, the method, at 265, adds the physical characteristics to the modified response. If the physical characteristics should be included in the modified response, the method ends at 270 by transmitting the modified response to the virtual machine. By checking the modified response for the inclusion of the pseudo-identity of the storage device and the physical characteristics of the storage device, the method facilitates sharing of storage devices with virtual machines while at the same time proffering the benefits of both virtualization and actions that can be taken in response to being aware of the physical characteristics of a storage device. These actions, both remedial and/or preemptive, which include migrating (or moving) the mapping of a virtual machine from one storage device to another, are described next.

An Example of Changing a Virtual Machine Mapping

It should be noted that virtual machine migration is typically associated with moving a virtual machine from one physical machine (or hypervisor) to another physical machine. In embodiments of this invention, the mapping of a pseudo storage device is changed from one storage device to another storage device (after copying the contents of the storage device) due to changes in operating conditions (or change in physical characteristics) of the physical storage device or due to the migration of the virtual machine from one physical machine to another. In one embodiment, the movement and/or migration of the virtual machine from one hypervisor to another hypervisor (e.g., from hypervisor 130 on computing device 125(2) to a different hypervisor implemented on computing device 125(2)) can also trigger a change and/or migration of mapping of the virtual device seen by the virtual machine.

Figure 2C:
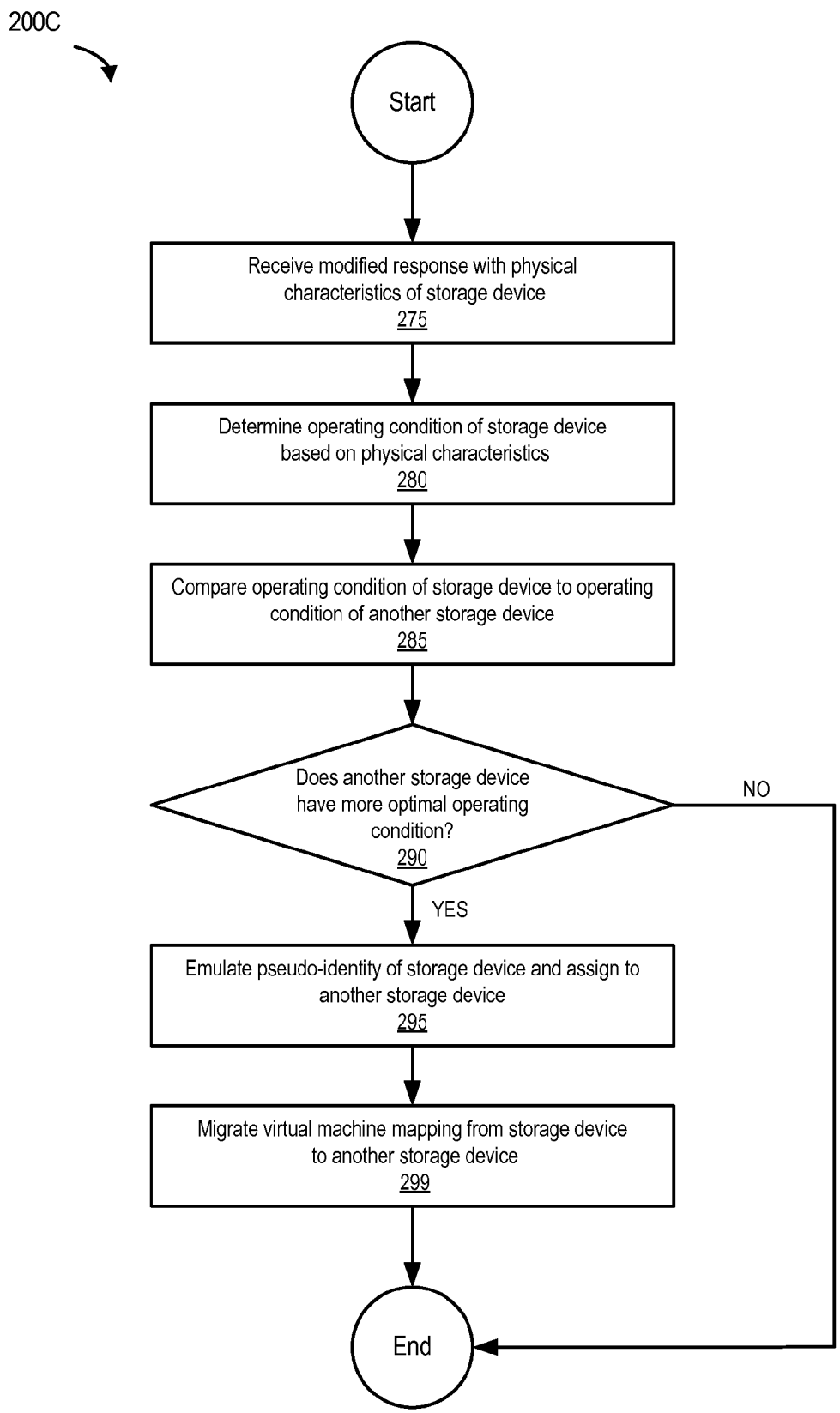
FIG. 2C is a flowchart of migrating the address space mapping of a virtual machine to another storage device, according to one embodiment of the present invention.

FIG. 2C is a flowchart of a method of migrating/changing a mapping of a virtual machine from one storage to another storage device. Changing the mapping can be user-initiated. The method begins at 275 by receiving a modified response with physical characteristics of the storage device. It should be noted that the modified response also includes the pseudo-identity of the storage device. The method continues at 280 by determining an operating condition of the storage device based on the physical characteristics of the storage device. In one embodiment, one or more physical characteristics of the storage device include, but are not limited to, an operating temperature of the storage device, a wear-leveling associated with the storage device, and/or a cleanup activity associated with the storage device. The one or more physical characteristics of the storage device are associated with the operating condition of the storage device. Although the pseudo-identity of the storage device is constant, the operating condition of the storage device can change based on the physical characteristics of the storage device. Consequently, another storage device can have a better and/or more optimal operating condition compared to the storage device.

Accordingly, at 285, the method compares the operating condition of the storage device to the operating condition of another storage device. For example, storage device 110(N) may have a better and/or more optimal operating condition compared to storage device 110(1) measured by an operating temperature of the two storage devices. An operating temperature is the temperature at which an electrical or mechanical device, operates. Here, storage device 110(1) can only operate effectively within a specified temperature range which can vary based on the storage device's function and application context. For example, over-utilization of storage device 110(1) caused by excessive read and/or write operations by virtual machines 120(1)-120(4) may result in a high operating temperature of storage device 110(1). Outside the specified range, storage device 110(1) may fail. Therefore, it can be desirable for the virtual machines utilizing storage device 110(1) for storage purposes to move to an alternate storage device with an operating temperature which is within the specified and/or safe temperature range.

The method, at 290, determines whether another storage device (e.g., storage device 110(N)) has a more optimal (or acceptable) operating condition (e.g., compared to storage device 110(1)). Whether another storage device has a more optimal operating condition can be determined in a variety of ways. In one embodiment, migration module 170 monitors the operating condition of storage device 110(1), and if the given operating condition (e.g., operating temperature) of storage device 110(1) exceeds a certain specified range, migration module 170 determines that storage device 110(1) is not optimal, and further determines whether storage device 110(N) is within the specified operating (temperature) range. In another embodiment, an administrator can pre-determine an optimal operating condition of the storage device. In yet another embodiment, an error and operating condition tracking mechanism of multiple storage devices can be monitored to determine which storage device has an optimal operation condition.

An optimal (or acceptable) operating condition of a storage device compared to another storage device may be determined by comparing one or more physical characteristics of the storage devices including, but not limited to, an operating temperature of the storage devices, a wear-leveling associated with the storage devices, or a cleanup activity associated with the storage devices. For example, after a SSD-based storage device reaches a threshold, a cleanup activity is performed on the storage device to free up empty slots on the storage device, which can subsequently be used for reads and/or writes. This so called garbage collection rate can be different for different storage devices. Because cleanup activities are typically accumulated over a period of time and performed at a later time, a storage device may inadvertently accumulate a lot of garbage data (e.g., occupied space on the storage device that should be cleared out by the cleaning activity but for the waiting period). For example, if the extra storage space in storage device 110(1) is occupied by garbage data and virtual machine 120(4) requires an additional 200 GB for a storage operation, this additional 200 GB may not be available to virtual machine 120(4) until the cleanup activity has been completed.

By presenting a pseudo-identity to virtual machine 120(4), hypervisor 130 permits virtual machine 120(4) to migrate the virtual machine mapping to computing device 125(2) which is coupled to storage device 110(N) via network 105. If storage device 110(N) does not have a later scheduled cleanup activity or has already completed its cleanup activity, then, at least from the point of view of virtual machine 120(4), storage device 110(N) is a fresh storage device with the necessary storage space provided by address space module 165. Because hypervisor 130 relays the same pseudo-identity for both storage device 110(1) and storage device 110(N) to virtual machine 120(4), the mapping of virtual machine 120(4), if migrated to storage device 110(N) from storage device 110(1), can enable virtual machine 120(4) to operate under the assumption that virtual machine 120(4) is reading from and/or writing to the same storage device, albeit with more optimal (or, at least, improved/acceptable) operating conditions.

In one embodiment, the modified response provides the virtual machine with the physical characteristics of the storage device by using the hypervisor to map the storage device to the virtual machine such that the virtual machine sees the virtual characteristics of the storage device. Under this scenario, even if the virtual machine is migrated to another storage device, the requested characteristics remain the same because the hypervisor attaches a modeled virtual value of the physical characteristics of the storage device to the virtual machine. Accordingly, if another storage device has a more optimal operating condition compared to the storage device, the method, at 295, emulates the pseudo-identity of the storage device and assigns the emulated pseudo-identity to another storage device. This emulation and assignment can be carried out by pseudo-identity module 180. Finally, at 299, the method migrates/changes the mapping of the virtual machine from the storage device to another storage device. Therefore, migration based on an assigned pseudo-identity and modeled physical characteristics provides the advantages of virtualization without sacrificing the benefits of being aware of a storage device's physical characteristics. The method not only permits utilization of physical characteristics of a storage device, but also permits a virtualization function by dynamically changing the mapping of the virtual machine from one storage device to another storage device. The contents of the storage device can also be transferred prior to the change of mapping so that the virtual machine has the same data available from the new storage device.

FIGS. 3A and 3B illustrate a mapping table and a migration table respectively. In one embodiment, hypervisor 130 acts as a broker and/or an abstraction layer between the virtual machine and the storage device. For example, if virtual machine 120(3) is using storage device 110(1) and virtual machine 120(4) is using storage device 110(N), hypervisor 130 presents the characteristics of storage device 110(1) as a modeled value. There are at least two types of characteristics of a storage device that be presented by the hypervisor as a unified modeled value to the virtual machines. First, the identity of the storage device can be emulated and presented as a pseudo-identity to the virtual machines (e.g., identity X). The device identity, when presented as the pseudo-identity, is a static value and does not change. Second, the operating condition based on the physical characteristics of the storage device can also be virtualized by the hypervisor as a unified characteristic (e.g., characteristic Y). But it should be noted that a change in the operating condition based on the physical characteristics of the storage device can necessitate migration of the mapping of the virtual machine from one storage device to another storage device.

However, although the operating condition of a storage device can change, thus requiring migration, because of the virtualization of the storage devices provided within the hypervisor, the virtual machine still views the new storage device as being the same virtual storage device as the old storage device. In addition, because address space module 165 ensures that the virtual machine, upon migration of the mapping, is still presented with the same amount and arrangement of storage space (albeit in a different address space on a different storage device), the virtual machine can avoid a negative or less than optimal operating condition associated with the old storage device and can migrate the virtual machine mapping to another storage device while maintaining the benefits provided by virtualization (e.g., running application 155 and/or utilizing virtual disk 140(4) for storage operations without interruption). From the perspective of the virtual machine, reading and/or writing of the storage device employs the same storage device, when in reality, the physical storage device has changed.

The hypervisor, by providing an abstraction layer, provides what appears to each virtual machine as its own virtual drive. However, the translations taking place within the hypervisor map not just the pseudo-identity of the storage device, but also the physical characteristics of the storage device. Accordingly, the abstraction layer provided by the hypervisor permits live migration of the mapping (change of mapping) of the virtual machine between two or more storage devices.

The systems described herein decouple the storage device and the mapping of the virtual storage devices thereto, and permit a virtual machine to migrate (or move) virtual machine mapping from one physical storage device to another without notice to an interception of the affected virtual machine. At the same time, the present invention also takes advantage of the operating condition of the storage device, and thus allows dynamic growing or shrinking of virtual machine storage based on devices of the virtual machine(s) in question.

An Example of a Computing Environment

Figure 4:
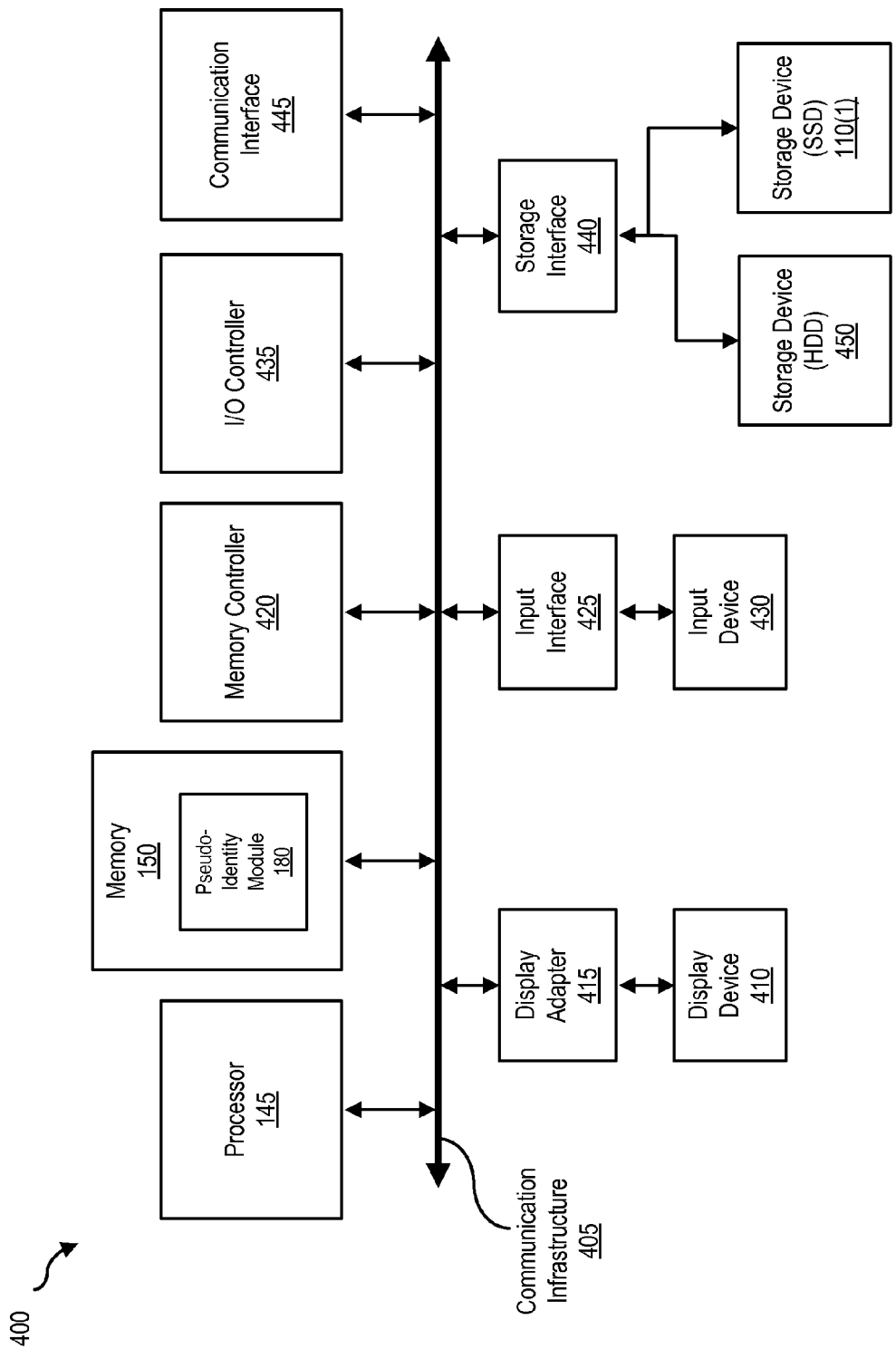
FIG. 4 is a block diagram of a computing device, illustrating how a pseudo-identity module can be implemented in software, according to one embodiment of the present invention.

FIG. 4 is a block diagram of a computing system 400 capable of implementing a pseudo-identity module 180 as described above. Computing system 400 broadly represents any single or multi-processor computing device or system capable of executing computer-readable instructions. Examples of computing system 400 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 400 may include at least one processor 145 and a system memory 150. By executing the software that implements pseudo-identity module 180, computing system 400 becomes a special purpose computing device that is configured to share storage devices with virtual machines.

Processor 145 generally represents any type or form of processing unit capable of processing data or interpreting and executing instructions. In certain embodiments, processor 145 may receive instructions from a software application or module. These instructions may cause processor 145 to perform the functions of one or more of the embodiments described and/or illustrated herein. For example, processor 145 may perform and/or be a means for performing all or some of the operations described herein. Processor 145 may also perform and/or be a means for performing any other operations, methods, or processes described and/or illustrated herein.

Memory 150 generally represents any type or form of volatile or non-volatile storage device or medium capable of storing data and/or other computer-readable instructions. Examples of memory 150 include, without limitation, random access memory (RAM), read only memory (ROM), flash memory, or any other suitable memory device. Although not required, in certain embodiments computing system 400 may include both a volatile memory unit (such as, for example, memory 150) and a non-volatile storage device (such as, for example, storage device 110(1) as described in detail below). In one example, program instructions implementing a pseudo-identity module 180 may be loaded into memory 150.

Figure 5:
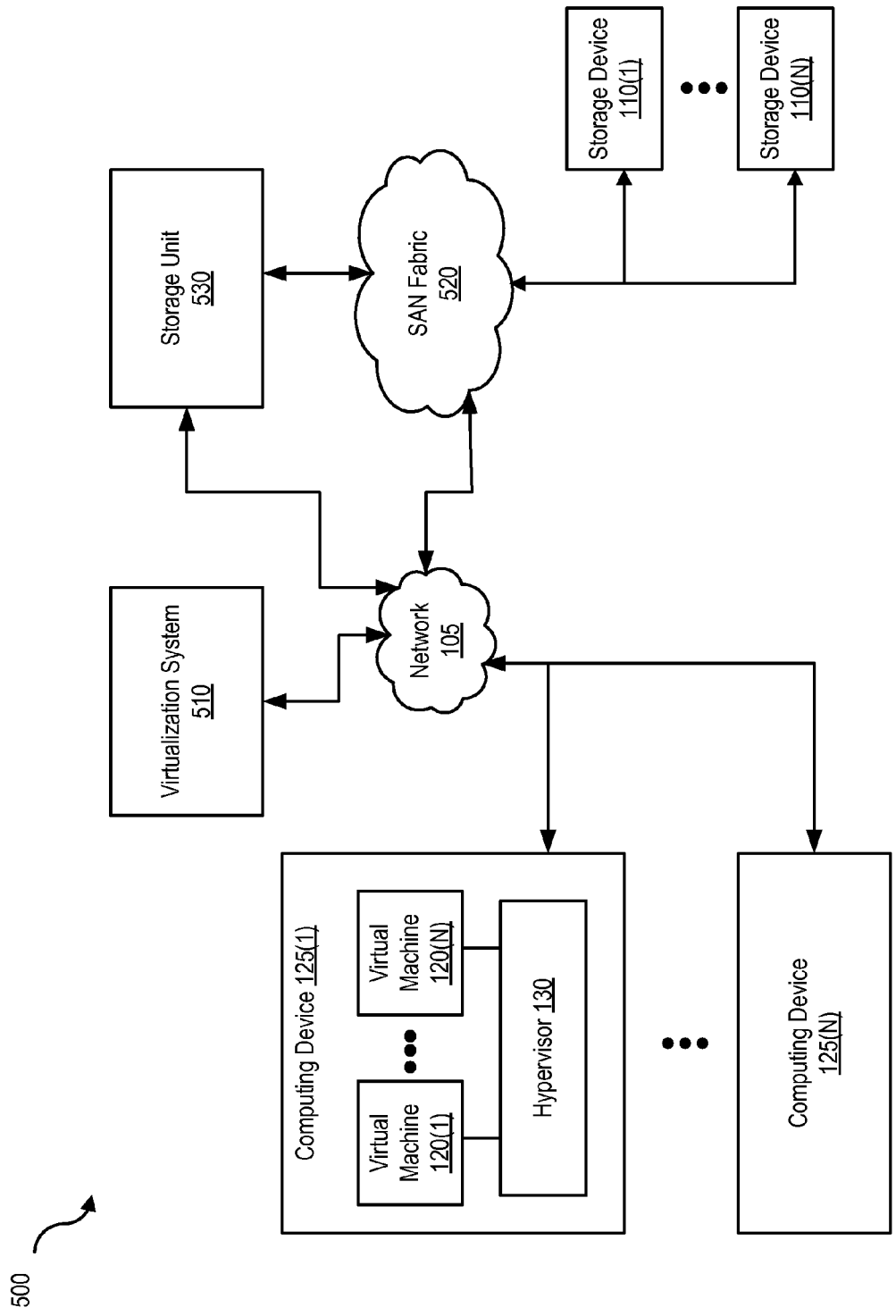
FIG. 5 is a block diagram of a networked system, illustrating how various computing devices can communicate via a network, according to one embodiment of the present invention.

In certain embodiments, computing system 400 may also include one or more components or elements in addition to processor 145 and memory 150. For example, as illustrated in FIG. 5, computing system 500 may include a memory controller 420, an Input/Output (I/O) controller 435, and a communication interface 445, each of which may be interconnected via a communication infrastructure 405. Communication infrastructure 405 generally represents any type or form of infrastructure capable of facilitating communication between one or more components of a computing device. Examples of communication infrastructure 405 include, without limitation, a communication bus (such as an Industry Standard Architecture (ISA), Peripheral Component Interconnect (PCI), PCI express (PCIe), or similar bus) and a network.

Memory controller 420 generally represents any type or form of device capable of handling memory or data or controlling communication between one or more components of computing system 400. For example, in certain embodiments memory controller 420 may control communication between processor 145, memory 150, and I/O controller 435 via communication infrastructure 405. In certain embodiments, memory controller 420 may perform and/or be a means for performing, either alone or in combination with other elements, one or more of the operations or features described and/or illustrated herein.

I/O controller 435 generally represents any type or form of module capable of coordinating and/or controlling the input and output functions of a computing device. For example, in certain embodiments I/O controller 435 may control or facilitate transfer of data between one or more elements of computing system 400, such as processor 145, memory 150, communication interface 445, display adapter 415, input interface 425, and storage interface 440.

Communication interface 445 broadly represents any type or form of communication device or adapter capable of facilitating communication between computing system 400 and one or more additional devices. For example, in certain embodiments communication interface 445 may facilitate communication between computing system 400 and a private or public network including additional computing systems. Examples of communication interface 445 include, without limitation, a wired network interface (such as a network interface card), a wireless network interface (such as a wireless network interface card), a modem, and any other suitable interface. In at least one embodiment, communication interface 445 may provide a direct connection to a remote server via a direct link to a network, such as the Internet. Communication interface 445 may also indirectly provide such a connection through, for example, a local area network (such as an Ethernet network), a personal area network, a telephone or cable network, a cellular telephone connection, a satellite data connection, or any other suitable connection.

In certain embodiments, communication interface 445 may also represent a host adapter configured to facilitate communication between computing system 400 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Serial Advanced Technology Attachment (SATA), Serial Attached SCSI (SAS), and external SATA (eSATA) host adapters, Advanced Technology Attachment (ATA) and Parallel ATA (PATA) host adapters, Fibre Channel interface adapters, Ethernet adapters, or the like.

Communication interface 445 may also allow computing system 500 to engage in distributed or remote computing. For example, communication interface 445 may receive instructions from a remote device or send instructions to a remote device for execution.

As illustrated in FIG. 4, computing system 400 may also include at least one display device 410 coupled to communication infrastructure 405 via a display adapter 415. Display device 410 generally represents any type or form of device capable of visually displaying information forwarded by display adapter 415. Similarly, display adapter 415 generally represents any type or form of device configured to forward graphics, text, and other data from communication infrastructure 405 (or from a frame buffer, as known in the art) for display on display device 410.

As illustrated in FIG. 4, computing system 400 may also include at least one input device 430 coupled to communication infrastructure 405 via an input interface 425. Input device 430 generally represents any type or form of input device capable of providing input, either computer or human generated, to computing system 400. Examples of input device 430 include, without limitation, a keyboard, a pointing device, a speech recognition device, or any other input device.

As illustrated in FIG. 4, computing system 400 may also include a storage device 450 and a storage device 110(1) coupled to communication infrastructure 405 via a storage interface 440. Devices 450 and 110(1) generally represent any type or form of storage device or medium capable of storing data and/or other computer-readable instructions. For example, devices 450 and 110(1) may each include a magnetic disk drive (e.g., a so-called hard drive), a floppy disk drive, a magnetic tape drive, an optical disk drive, a flash drive, or the like. Storage interface 440 generally represents any type or form of interface or device for transferring data between storage devices 450 and 110(1) and other components of computing system 400.

In certain embodiments, devices 450 and 110(1) may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Devices 450 and 110(1) may also include other similar structures or devices for allowing computer software, data, or other computer-readable instructions to be loaded into computing system 400. For example, devices 450 and 110(1) may be configured to read and write software, data, or other computer-readable information. Devices 450 and 110(1) may also be a part of computing system 500 or may be a separate device accessed through other interface systems.

Many other devices or subsystems may be connected to computing system 400. Conversely, all of the components and devices illustrated in FIG. 4 need not be present to practice the embodiments described and/or illustrated herein. The devices and subsystems referenced above may also be interconnected in different ways from that shown in FIG. 4.

Computing system 400 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 500 for storage in memory via a network such as the Internet or upon a carrier medium.

The computer-readable medium containing the computer program may be loaded into computing system 400. All or a portion of the computer program stored on the computer-readable medium may then be stored in memory 150 and/or various portions of devices 450 and 110(1). When executed by processor 145, a computer program loaded into computing system 400 may cause processor 145 to perform and/or be a means for performing the functions of one or more of the embodiments described and/or illustrated herein. Additionally or alternatively, one or more of the embodiments described and/or illustrated herein may be implemented in firmware and/or hardware. For example, computing system 400 may be configured as an application specific integrated circuit (ASIC) adapted to implement one or more of the embodiments disclosed herein.

FIG. 5 is a block diagram of a network architecture 500 in which virtualization system 510, computing devices 125(1)-(N) and storage unit 530 may be coupled to a network 105. Computing devices 125(1)-(N) generally represent any type or form of computing device or system, such as computing system 400 in FIG. 4.

As illustrated in FIG. 5, a storage unit 530 may be attached to computing device 125(1) through network 105. Storage unit 530 generally represents any type or form of storage device or medium capable of storing data and/or other computer-readable instructions. In certain embodiments, storage devices 110(1)-(N) may represent network-attached storage (NAS) devices configured to communicate with computing devices 125(1)-(N) using various protocols, such as Network File System (NFS), Server Message Block (SMB), or Common Internet File System (CIFS).

Computing devices 125(1)-(N) may also be connected to a storage area network (SAN) fabric 520. SAN fabric 520 generally represents any type or form of computer network or architecture capable of facilitating communication between multiple storage devices. SAN fabric 520 may facilitate communication between computing devices 125(1)-(N) and a plurality of storage devices 110(1)-(N). SAN fabric 520 may also facilitate, via network 105, communication between virtualization system 510 and storage devices 110(1)-(N). As with storage unit 530, storage devices 110(1)-(N) generally represent any type or form of storage device or medium capable of storing data and/or other computer-readable instructions.

In certain embodiments, and with reference to computing system 400 of FIG. 4, a communication interface, such as communication interface 445 in FIG. 4, may be used to provide connectivity between virtualization system 510 and network 105. Although FIG. 5 depicts the use of a network (such as the Internet) for exchanging data, the embodiments described and/or illustrated herein are not limited to the Internet or any particular network-based environment.

In at least one embodiment, all or a portion of one or more of the embodiments disclosed herein may be encoded as a computer program and loaded onto and executed by computing devices 125(1)-(N), storage devices 110(1)-(N) or any combination thereof. All or a portion of one or more of the embodiments disclosed herein may also be encoded as a computer program, stored in computing devices 125(1)-(N), computing devices 125(1)-(N), and distributed to virtualization system 510 over network 105.

In some examples, all or a portion of the computing devices in FIGS. 1A, 1B and 4 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In addition, one or more of the components described herein may transform data, physical devices, and/or representations of physical devices from one form to another. For example, a pseudo-identity module 180 in FIG. 1B may transform behavior of a computing device in order to cause the computing device to share storages devices with virtual machines.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
    creating a pseudo-identity for a physical storage device of
        a plurality of physical storage devices, wherein
        the physical storage device is coupled to a computing device,
            the pseudo-identity is created by a hypervisor associated with the computing device, and
            the pseudo-identity facilitates
                access to the physical storage device by a virtual machine of a plurality of virtual machines associated with the hypervisor, and
                presentation of one or more physical characteristics of the physical storage device to the virtual machine; and
    assigning a portion of an address space of the physical storage device to the virtual machine using the pseudo-identity.

2. The method of claim 1 comprising:
    modifying a response to a command issued to the physical storage device, wherein
        the command is issued by the virtual machine to obtain a capacity and the one or more physical characteristics of the physical storage device, and
        the response to the command comprises the capacity and the one or more physical characteristics of the pseudo-identity of the physical storage device, and the one or more physical characteristics of the physical storage device exposed to the virtual machine.

3. The method of claim 2 comprising:
    migrating a mapping of the virtual machine to an another physical storage device, wherein
        prior to the migration of the mapping, the hypervisor emulates the pseudo-identity of the physical storage device, and assigns the pseudo-identity to the another physical storage device.

4. The method of claim 1, wherein
    each virtual machine of the plurality of virtual machines associated with the hypervisor is assigned a unique address space of the physical storage device, and
    the address space of the physical storage device assigned to each virtual machine is different.

5. The method of claim 3, wherein
    each virtual machine of the plurality of virtual machines shares the pseudo-identity of the physical storage device.

6. The method of claim 5, wherein
    each virtual machine of the plurality of virtual machines has access to the one or more physical characteristics of the physical storage device, and
    the one or more physical characteristics of the physical storage device are visible to the virtual machine.

7. The method of claim 6, wherein
    the one or more physical characteristics of the physical storage device comprise:
        an operating temperature of the physical storage device,
        a wear-leveling associated with the physical storage device, or
        a cleanup activity associated with the physical storage device.

8. The method of claim 6, wherein
    the one or more physical characteristics of the physical storage device are associated with an operating condition of the physical storage device.

9. The method of claim 8, comprising:
    calculating the operating condition of the physical storage device,
    calculating an another operating condition of the another physical storage device,
    comparing the operating condition of the physical storage device and the another operating condition of the another physical storage device, and
    based on the comparing, determining whether to migrate the mapping of the virtual machine from the physical storage device to the another physical storage device, wherein if the another operating condition is optimal compared to the operating condition, performing the migration, and if the operating condition is optimal compared to the another operating condition, not performing the migration.

10. The method of claim 1, wherein
the physical storage device is a solid state disk, and
the solid state disk is used by the virtual machine associated with the hypervisor to cache data.

11. A method comprising:
creating a pseudo-identity for a physical storage device, wherein
    the physical storage device is coupled to a computing device, the pseudo-identity is created by a hypervisor associated with the computing device, and the pseudo-identity facilitates access to the physical storage device by a virtual machine of a plurality of virtual machines associated with the hypervisor and presentation of one or more physical characteristics of the physical storage device to the virtual machine;
assigning a portion of an address space of the physical storage device to the virtual machine using the pseudo-identity;
calculating an operating condition of the physical storage device based on the one or more physical characteristics; and
migrating a mapping of the virtual machine from the physical storage device to another physical storage device, if the operating condition of the physical storage device is optimal compared to an another operating condition of the another physical storage device.

12. A system comprising:
one or more processors; and
a memory coupled to the one or more processors, wherein the memory stores program instructions executable by the one or more processors to:
    create a pseudo-identity for a storage device of a plurality of physical storage devices, wherein
        the physical storage device is coupled to a computing device,
        the pseudo-identity is created by a hypervisor associated with the computing device, and
        the pseudo-identity facilitates
            access to the physical storage device by a virtual machine of a plurality of virtual machines associated with the hypervisor, and
            presentation of one or more physical characteristics of the physical storage device to the virtual machine; and
    assign a portion of an address space of the physical storage device to the virtual machine using the pseudo-identity.

13. The system of claim 12, comprising
modifying a response to a command issued to the physical storage device, wherein
    the command is issued by the virtual machine to obtain a capacity and the one or more physical characteristics of the physical storage device, and
    the response to the command comprises the capacity and the one or more physical characteristics of the pseudo-identity of the physical storage device, and the one or more physical characteristics of the physical storage device exposed to the virtual machine; and
migrating a mapping of the virtual machine to an another physical storage device, wherein prior to the migration of the mapping, the hypervisor emulates the pseudo-identity of the physical storage device, and assigns the pseudo-identity to the another physical storage device.

14. The system of claim 13, wherein
each virtual machine of the plurality of virtual machines shares the pseudo-identity of the physical storage device,
each virtual machine of the plurality of virtual machines has access to the one or more physical characteristics of the physical storage device, and
the one or more physical characteristics of the physical storage device are visible to the virtual machine.

15. The system of claim 14, wherein
the one or more physical characteristics of the physical storage device comprise:
    an operating temperature of the physical storage device,
    a wear-leveling associated with the physical storage device, or
    a cleanup activity associated with the physical storage device; and
the one or more physical characteristics of the physical storage device are associated with an operating condition of the physical storage device.

16. The system of claim 15, comprising
calculating the operating condition of the physical storage device;
calculating an another operating condition of the another physical storage device;
comparing the operating condition of the physical storage device and the another operating condition of the another physical storage device; and
based on the comparing, determining whether to migrate the mapping of the virtual machine from the physical storage device to the another physical storage device, wherein if the another operating condition is optimal compared to the operating condition, performing the migration, and if the operating condition is optimal compared to the another operating condition, not performing the migration.

17. A computer readable storage medium comprising program instructions executable to:
create a pseudo-identity for a storage device of a plurality of physical storage devices, wherein
    the physical storage device is coupled to a computing device,
    the pseudo-identity is created by a hypervisor associated with the computing device, and
    the pseudo-identity facilitates
        access to the physical storage device by a virtual machine of a plurality of virtual machines associated with the hypervisor, and
        presentation of one or more physical characteristics of the physical storage device to the virtual machine; and
assign a portion of an address space of the physical storage device to the virtual machine using the pseudo-identity.

18. The computer readable storage medium of claim 17, comprising
modifying a response to a command issued to the physical storage device, wherein
    the command is issued by the virtual machine to obtain a capacity and the one or more physical characteristics of the physical storage device, the response to the command comprises the capacity and the one or more physical characteristics of the pseudo-identity of the physical storage device, and the one or more physical characteristics of the physical storage device exposed to the virtual machine; and migrating a mapping of the virtual machine to an another physical storage device, wherein
prior to the migration of the mapping,
the hypervisor emulates the pseudo-identity of the physical storage device, and
assigns the pseudo-identity to the another physical storage device.

19. The computer readable storage medium of claim 18, wherein
each virtual machine of the plurality of virtual machines shares the pseudo-identity of the physical storage device,
each virtual machine of the plurality of virtual machines has access to the one or more physical characteristics of the physical storage device, and
the one or more physical characteristics of the physical storage device are visible to the virtual machine.

20. The computer readable storage medium of claim 19, wherein
the one or more physical characteristics of the physical storage device comprise:
an operating temperature of the physical storage device,
a wear-leveling associated with the physical storage device, or
a cleanup activity associated with the physical storage device; and
the one or more physical characteristics of the physical storage device are associated with an operating condition of the physical storage device.

21. The computer readable storage medium of claim 20, comprising
calculating the operating condition of the physical storage device;
calculating an another operating condition of the another physical storage device;
comparing the operating condition of the physical storage device and the another operating condition of the another physical storage device; and
based on the comparing, determining whether to migrate the mapping of the virtual machine from the physical storage device to the another physical storage device, wherein
if the another operating condition is optimal compared to the operating condition, performing the migration, and
if the operating condition is optimal compared to the another operating condition, not performing the migration.

* * * * *